United States Patent [19]

Dvorak

[11] 4,186,312
[45] Jan. 29, 1980

[54] AC ELECTRICAL POWER SYSTEMS WITH ALTERNATE SOURCES OF POWER

[76] Inventor: Sidney T. Dvorak, 9425 Stenton Ave., Philadelphia, Pa. 19118

[21] Appl. No.: 880,466

[22] Filed: Feb. 23, 1978

[51] Int. Cl.$^2$ ............................................. F01D 15/10
[52] U.S. Cl. ..................................... 290/4 R; 290/44; 290/43
[58] Field of Search .......................... 290/1, 4, 42–44, 290/53–55; 417/330–337; 60/495–507, 398

[56] References Cited

U.S. PATENT DOCUMENTS

| 996,334 | 6/1911 | Haskins | 290/44 |
|---|---|---|---|
| 2,329,675 | 9/1943 | Albers | 290/4 R |
| 2,539,862 | 1/1951 | Rushing | 417/336 X |
| 3,477,013 | 11/1969 | Smith | 290/4 R |
| 3,720,840 | 3/1973 | Gregg | 290/44 |
| 3,743,848 | 7/1973 | Strickland | 290/44 |

Primary Examiner—Gene Z. Rubinson
Assistant Examiner—John W. Redman
Attorney, Agent, or Firm—Arthur A. Jacobs

[57] ABSTRACT

AC electrical power system comprising an electrical alternator and a primary power source which is alternatively and automatically utilizable with an emergency power source when the primary power source fails, the primary power source being either a wind-driven impeller or a water-driven turbine which are selectively and alternatively utilized.

7 Claims, 3 Drawing Figures

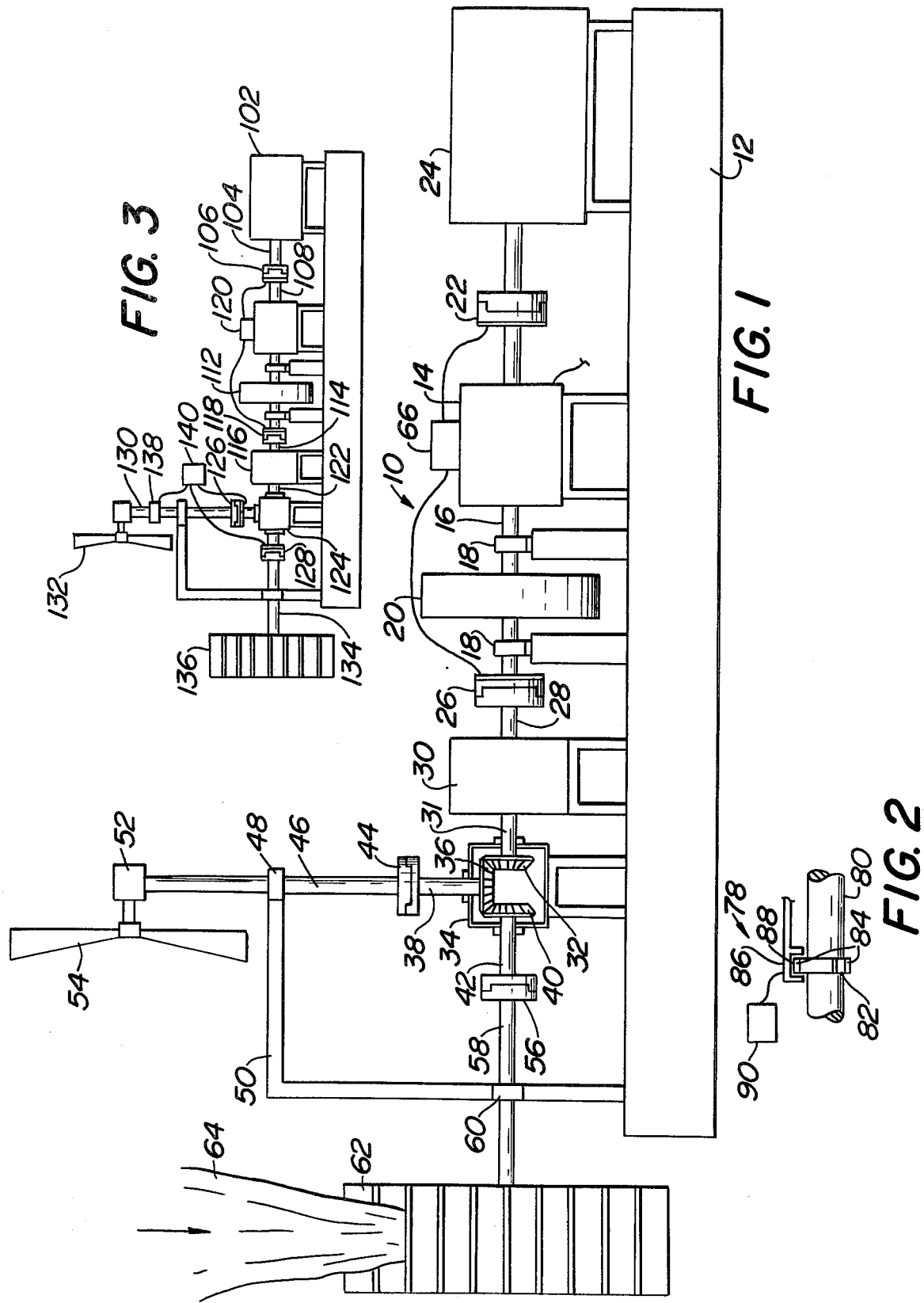

AC ELECTRICAL POWER SYSTEMS WITH ALTERNATE SOURCES OF POWER

This invention relates to electrical power systems, and it particularly relates to electrical power systems which utilize an AC alternator with natural wind or water supply sources therefor.

In power systems which utilize an AC alternator, it is not only necessary to maintain the frequency of the current at a fixed rate but it is required, for effective operation, that there be an equalization of output at all times. This is an especial problem when the system is designed to utilize power supplied by natural phenomenon, such as wind or water, rather than fossil fuels, because the energy output of wind or water may vary considerably from almost one moment to the next.

It has, heretofore, been proposed in the generation of power to use both fossil fuel-derived power sources and either wind or water-derived power sources, wherein the natural wind or water-derived power is used as an auxiliary power source for the fossil fuel-derived power source such as a combustion engine or the like; however, the two types of power sources were either used simultaneously or were used to operate separate generators.

It has also, heretofore, been proposed to utilize any excess energy derived from the natural power source by storing it in batteries or by using it to obtain hydrogen electrolytically, and then using the hydrogen to hydrogenate fossil fuels. These hydrogenated fuels were, thereafter, converted to liquid fuels; such liquid fuels being stored for subsequent use in feeding internal combustion engines acting as auxiliary generation means.

However, batteries provide only DC current, and this DC current must first be converted by rectification to AC current before it can be used in an AC system. Furthermore, since wind or water power is, by its nature, intermittent, it is first necessary to convert this intermittent power to DC current before storing it in the batteries. Consequently, the use of storage batteries for storing natural (wind or water)-derived energy requires first a conversion of the energy to DC energy, the storage of the DC energy in batteries, then the conversion of the DC energy back to AC energy, and, finally, the passage of the AC energy to the system.

As regards the electrolytic conversion of the energy to hydrogen and its use to convert fossil fuel into liquid fuel, this is not only a relatively expensive and complex process, but it generally utilizes as much fossil fuel as would ordinarily be required to operate an engine. However, in the present era of fossil fuel shortages, the use of such fuel is to be avoided whenever possible. Furthermore, it presents a problem both of storage and transit of the liquid fuel.

It is, therefore, an object of the present invention to overcome the aforementioned difficulties and problems by providing an electrical power system utilizing an AC alternator directly, and wherein natural energy sources, such as wind or water, are selectively utilizable to directly provide energy to the AC alternator, the AC alternator also being selectively or automatically operable by another power source when the natural energy sources fail or decrease their energy output.

Another object of the present invention is to provide an electrical power system of the aforesaid type wherein the AC alternator is always maintained at a fixed constant speed.

Another object of the present invention is to provide an electrical power system of the aforesaid type which is relatively simple and inexpensive in construction and design and which is easy to install, service and use.

Other objects and many of the attendant advantages of the present invention will be readily appreciated as the same becomes better understood by reference to the following description when read in conjunction with the accompanying drawings wherein:

FIG. 1 is a side elevational view, with parts shown in section, of a system embodying the present invention.

FIG. 2 is a side elevational view of alternative type of sensing means.

FIG. 3 is a side elevational view of a modified form of the invention.

Referring in greater detail to the drawings, there is shown in FIG. 1 an electrical power system, generally designated 10, comprising a base 12 on which is mounted an AC alternator 14 of a type generally known in the art. The alternator 14 is provided with a shaft 16 extending through spaced bearings 18. Between the bearings 18 a stored energy flywheel 20 is mounted on the shaft 16. This flywheel is used to maintain momentum during the time intervals between changes of power sources.

The shaft 16 is releasably coupled at one end, through a fluid clutch 22, to an engine 24 which may be of any feasible type such as a diesel, gas or gasoline engine or a gas or steam turbine. At its other end, the shaft 16 is releasably coupled, through a fluid clutch 26, to a shaft 28 of a variable speed input-constant speed output drive unit 30. This unit may be any one of several types that are commercially available. One such unit is the "HEXact Type 1 Control" manufactured by Lovejoy Inc., Downers Grove, Illinois, which utilizes a driven pulley, the speed of which is controlled by a servo motor reducer forming an integral part of the adjustable pulley, whereby any imput signal to the control unit will automatically start the servo motor to effect either an increase or decrease in the driven pulley RPM. The unit 30 includes a magnetic pickup and a pickup gear, whereby any change in the predetermined RPM of the driven pulley is monitored by the magnetic pickup, sending a signal to the control unit, resulting in an adjustment of the pulley until the predetermined RPM is re-established. This particular construction is not further described herein because it comprises a commercially-available device, as indicated above, and, by itself, forms no part of the present invention except in the combination disclosed and claimed herein.

The shaft 31 extends from the unit 30 and is provided with a bevel gear 32 within a gear housing 34. The gear 32 is in mesh with a bevel gear 36 mounted on a shaft 38, the gear 36 also being in mesh with a bevel gear 40 mounted on a shaft 42.

The shaft 38 is releasably coupled, through a clutch 44, to a shaft 46 journeled in a collar 48 of a bracket 50 mounted on the base 12. The shaft 46 is provided with a gear (not shown) which is in engagement with gearing connected to a wind-driven impeller 54 having variable pitch impeller blades. The impeller is adjustable from the full vertical to the full horizontal plane.

The shaft 42 is releasably coupled, through a clutch 56, to one end of a shaft 58 journeled in a collar 60 of the bracket 50. The shaft 58 is connected, at its other end, to a water-driven turbine 62 which may either be positioned in a stream or driven by overhead water such as indicated at 64. The clutches 44 and 56 may either be of the manual type or they may be electrically controlled, but, in either case, they are selectively operated to place either the impeller 54 or the turbine 62 into operative relation with the shaft of the drive unit 30.

A sensor or switch unit 66 is electrically connected to the alternator 14 to monitor the power received by the alternator. The sensor unit is here shown as being mounted on the alternator housing; however, it may be separately mounted if so desired.

The sensor unit 66 may be any one of several commercially-available units. One such unit is the "ZTS 40-260A" manufactured by Zenith Controls, Inc., Chicago, Ill. This device contains heavy duty sensing relays which monitor the normal line. When the normal line falls or voltage falls to a predetermined point, the relays are de-energized, whereby the main control relay drops out, closing the circuit to the other or emergency drive. When normal voltage is restored to 90% of its rated value, the voltage sensing relays operate, whereby the main control relay pulls in and the activator is powered through the coil control relay contacts, restoring the transfer switch to the normal position. In the present system, this sensor unit 66 is electrically connected to the clutches 22 and 26 by means of standard electrical brushes or the like, whereby when the voltage drops below the predetermined voltage, the clutch 26 is disengaged and the clutch 22 is engaged to supply power to the generator from the engine 24.

Instead of the sensor unit shown at 66, a simpler unit may be used. Such a unit, which may be provided on the shaft 31, is shown at 78 in FIG. 2, and comprises a construction wherein the shaft 80, corresponding to the shaft 31, is provided with a ferrous circumferential rib 82 having one or more circumferentially-spaced lugs 84. A magnetic sensor element 86 is provided with a slot or channel 88 in which the rib 82 rides. The sensor 86 detects the speed of rotation of the shaft by means of a counter, of standard construction, indicated at 90. This speed of rotation is measured by the time intervals between the appearance of the lug or lugs 84 at the sensor element. The presence of the ferrous metal of the lugs at the magnetic sensor head, provides pulses, or signals, for the counter. When the rate of these pulses falls below a predetermined amount, the counter, which is electrically connected to the two clutches 22 and 26, releases the clutch 26 and engages the clutch 22. If the rate of these pulses increases to the predetermined amount, the counter releases the clutch 22 and engages the clutch 26, reinstating the drive to the natural energy source. If desired, the rib 82 may extend into the slot 88 and grooves may replace the lugs, whereby the absence of ferrous metal, caused by the grooves at the sensor results in the signals to the counter.

By means of the above system, either the wind-driven impellor or the turbine may be selectively connected as the primary drive means to directly drive the alternator 14; however when the power from the connected source falls below a predetermined value, the engine 24 is automatically placed into operation as an emergency drive means.

The above-described system provides for manual or other personal selection of either the wind or water-driven power means. However, a sensor, of the type indicated at 78 in FIG. 2, may also be connected between the clutches on the impeller and water-turbine shafts, such clutches being electrically actuated by the sensor so that when one power source, for example, the impeller falls below a predetermined input, the other power source, i.e. the water-turbine takes over. Then, if neither of these is able to apply sufficient power, the sensor, such as shown either at 66 or 78, cuases the eninge to take over. Such a system is shown in FIG. 3.

As shown in FIG. 3, the system, generally designated 100, comprises the same parts as the system in FIG. 1, namely an engine 102 having a shaft 104 coupled by a fluid clutch 106 to the shaft 108 of an alternator 110. The alternator shaft is provided with a flywheel 112 and is coupled to the shaft 114 of a variable speed drive unit 116, similar to that shown at 30 in FIG. 1, by means of a fluid clutch 118. A sensor unit 120, similar to that shown at 66 in FIG. 1, is electrically connected to the alternator 110 and is also electrically connected to the clutch 106 and the clutch 118. The shaft 122 from the unit 116 is provided with a bevel gear engaged with gearing within the gear box 124 in the same manner as shown in FIG. 1.

The clutches 126 and 128, in respective engagement with the shaft 130 of the impeller 132 and the shaft 134 of the turbine wheel 136, are the same as the corresponding clutches 44 and 56 in FIG. 1 except that the clutches 126 and 128 are electrically connected to a sensor 138 mounted on the shaft 130 of the impeller 132. The sensor 138 and its counter 140 form a sensing system that is similar to that shown at 78 in FIG. 2 and measures the power supplied by the impeller 132, so that when the rotation of the impeller shaft 130 falls below the predetermined minimum, the clutch 126 is released and the clutch 128 in engaged. If desired, the arrangement may be reversed so that the primary power source if the turbine wheel 136, in which case the sensor 138 is provided on the turbine shaft 134.

The invention claimed is:

1. An electrical power system comprising an alternator for generating AC current, primary drive means and emergency drive means for said alternator, said primary drive means comprising alternatively engaged wind-driven power means and water-driven power means, and said emergency drive means comprising a fuel-driven engine, said primary and emergency drive means being operatively and alternatively coupled to said alternator by corresponding releasable coupling means, switch means operatively connected to each of said coupling means, and a sensing means operatively connected to said alternator and to said switch means, said sensing means being adapted to sense the power delivered to the alternator and to actuate and deactuate said switch means in accordance with whether a predetermined power is being delivered to said alternator, said switch means being adapted to disengage one of said coupling means while engaging the other of said coupling means in response to the amount of power delivered from said primary drive means to said alternator as determined by said sensing means, said wind-driven power means and said water-driven power means being operatively and alternatively coupled to said alternator by a second set of releasable coupling means.

2. The system of claim 1 which includes a second switch means operatively connected to said second set of coupling means, said second switch means being constructed and arranged to disengage one of the coupling means of said second set in response to the amount of power delivered from a selected one of either said wind-driven or water-driven power means.

3. The power system of claim 1 wherein said switch means comprises a set of electrical relays operatively connected to said coupling means, said relays opening an electrical circuit to one of said coupling means and closing a circuit to the other of said coupling means in accordance with the amount of voltage delivered to the relays.

4. The power system of claim 1 wherein said switch means comprises at least one lug on a shaft connecting the primary drive means to the alternator, said lug being rotatably associated with a magnetic sensor, said sensor being operatively connected to a counter and being adapted to pass electrical signals to said counter corresponding to the speed of rotation of said shaft as measured by the successive appearances of the lug at said sensor, and said counter being operatively connected to said coupling means.

5. The power system of claim 1 wherein said second switch means comprises at least one lug on the shaft of a selected one of either the wind-driven or water-driven power means, said lug being rotatably associated with a magnetic sensor, said sensor being operatively connected to a counter and being adapted to pass electrical signals to said counter corresponding to the speed of rotation of said shaft as measured by the successive appearances of the lug at said sensor, and said counter being operatively connected to said second set of coupling means.

6. The power system of claim 1 wherein a variable speed input-constant speed output drive means is operatively connected between the primary drive means and the alternator.

7. The power system of claim 1 wherein a stored energy flywheel is operatively connected between the primary drive means and the alternator.

* * * * *